United States Patent
Noto et al.

(10) Patent No.: US 8,082,964 B2
(45) Date of Patent: Dec. 27, 2011

(54) TYRE FOR A VEHICLE WHEEL AND METHOD OF MANUFACTURING THE TYRE

(75) Inventors: Rodolfo Noto, Milan (IT); Gaetano Lo Presti, Milan (IT); Ignazio De Gese, Milan (IT); Claudio Lacagnina, Milan (IT)

(73) Assignee: Pirelli Pneumatici S.p.A., Milan (IT)

(*) Notice: Subject to any disclaimer, the term of this patent is extended or adjusted under 35 U.S.C. 154(b) by 935 days.

(21) Appl. No.: 10/549,448

(22) PCT Filed: Apr. 18, 2003

(86) PCT No.: PCT/IB03/01473
§ 371 (c)(1),
(2), (4) Date: Jun. 27, 2006

(87) PCT Pub. No.: WO2004/091939
PCT Pub. Date: Oct. 28, 2004

(65) Prior Publication Data
US 2006/0254691 A1  Nov. 16, 2006

(51) Int. Cl.
*B60C 9/02* (2006.01)
*B60C 15/05* (2006.01)
*B29D 30/16* (2006.01)
*B29D 30/18* (2006.01)

(52) U.S. Cl. ........ 152/540; 152/545; 152/550; 152/552; 152/553; 156/117; 156/132; 156/133; 156/135

(58) Field of Classification Search .................. 156/117, 156/123, 131, 132, 133, 135; 152/540, 541, 152/545, 550–554
See application file for complete search history.

(56) References Cited

U.S. PATENT DOCUMENTS

| | | | |
|---|---|---|---|
| 1,728,957 A * | 9/1929 | Dickinson | 156/441 |
| 3,815,652 A | 6/1974 | Pouilloux | |
| 4,248,287 A * | 2/1981 | Christman | 152/531 |
| 5,383,992 A | 1/1995 | Siegenthaler | |
| 5,705,007 A * | 1/1998 | Bohm et al. | 156/130.7 |
| 6,457,504 B1 * | 10/2002 | Caretta | 152/540 |
| 6,929,045 B1 * | 8/2005 | Ogawa | 152/539 |
| 2004/0154720 A1 * | 8/2004 | Auxerre | 152/544 |
| 2004/0154727 A1 * | 8/2004 | Weissert et al. | 156/117 |
| 2005/0076988 A1 * | 4/2005 | Noto et al. | 152/526 |

FOREIGN PATENT DOCUMENTS

| | | | |
|---|---|---|---|
| EP | 557615 A1 * | 9/1993 | |
| EP | 0 928 680 A1 | 7/1999 | |

(Continued)

*Primary Examiner* — Geoffrey L Knable
(74) *Attorney, Agent, or Firm* — Finnegan, Henderson, Farabow, Garrett & Dunner, L.L.P.

(57) ABSTRACT

A vehicle wheel tire includes a carcass structure, at least one annular reinforcing structure, a tread band, and a pair of sidewalls. The carcass structure includes at least one carcass ply, each including a plurality of elongated elements disposed around a cross-section profile of the tire. Each elongated element includes two side portions at mutually-spaced-apart positions and a crown portion that extends between the side portions. The at least one annular reinforcing structure includes at least one bead core. A fraction of the elongated elements is turned up around the at least one bead core. A method of manufacturing the tire includes preparing the elongated elements, disposing each elongated element on a toroidal support, applying at least one bead core at a region close to side portions of the elongated elements, and turning up ends of a fraction of the elongated elements around the at least one bead core.

26 Claims, 10 Drawing Sheets

FOREIGN PATENT DOCUMENTS

| | | |
|---|---|---|
| EP | 0 928 702 A1 | 7/1999 |
| EP | 0 983 876 A2 | 3/2000 |
| JP | 07195915 A * | 8/1995 |
| WO | WO 00/26043 | 5/2000 |
| WO | WO-02/094584 A1 * | 11/2002 |
| WO | WO 03/061953 A1 | 7/2003 |

* cited by examiner

TYRE FOR A VEHICLE WHEEL AND METHOD OF MANUFACTURING THE TYRE

CROSS-REFERENCE TO RELATED APPLICATIONS

This application is a national-phase entry under 35 U.S.C. §371 from International Application No. PCT/IB2003/001473, filed Apr. 18, 2003, in the International Bureau of the World Intellectual Property Organization, the content of which is relied upon and incorporated herein by reference.

BACKGROUND OF THE INVENTION

1. Field of the Invention

The present invention relates to a tyre for vehicle wheels and to a method of manufacturing it.

2. Description of the Related Art

A tyre for vehicle wheels usually comprises a carcass structure essentially consisting of one or more carcass plies shaped in a substantially toroidal conformation and having their axially opposite side edges in engagement with respective annular reinforcing structures, each comprising at least one bead core, each ply having a plurality of cords parallel to each other incorporated into at least one layer of elastomer material. Each annular reinforcing structure is incorporated in a so-called "bead" defined along an inner circumferential edge of the tyre for tyre anchoring to a corresponding mounting rim.

In the so-called "radial" tyres each of the cords arranged in the carcass ply or plies lies in a plane substantially radial to the tyre rotation axis, i.e. each cord has an orientation substantially orthogonal to the circumferential extension direction.

In this case a belt structure is generally applied to the carcass structure, at a radially external position, which belt structure comprises one or more belt strips shaped like a closed ring and essentially consisting of textile or metallic cords incorporated in a layer of elastomer material, parallel to each other and suitably oriented relative to the cords belonging to the adjacent carcass plies and/or belt strips.

Coaxially arranged at a radially external position to the belt structure is a tread band intended for rolling contact of the tyre on the ground and usually provided with a raised pattern defined by cuts and grooves formed in the band thickness which are adapted to ensure the necessary grip qualities of the tyre on the ground.

It is to be pointed out, to the aims of the present invention, that by the term "elastomer material" it is intended a composition comprising at least one elastomer polymer and at least one reinforcing filler and possibly additives of different types (cross-linking agents, plasticizers and other additives known in the art, for example).

Provided on the opposite sides of the tyre is a pair of sidewalls each of which covers a side portion of the tyre included between a so-called shoulder region located close to the corresponding side edge of the tread band, and the corresponding bead.

In the traditional manufacturing processes, formation of each carcass ply is carried out by making a rubberised fabric comprising a plurality of reinforcing thread-like elements, incorporated in a layer of elastomer material, parallel to each other, in the following referred to as "cords"; this term is used to define both individual strands (monofilaments, flosses, yarns, wires) and true cords, i.e. a structure comprising one or more strands twisted together, each consisting of a given number of elementary filaments twisted with each other. Said rubberised fabric is made through a calendering operation for example, in which a plurality of said cords disposed in coplanar side by side relationship with each other are sandwiched between two layers of elastomer material. The threads of said cords may consist of metal alloys such as steel, textile fibres, carbon fibres, glass fibres, Kevlar® or other fibres having an appropriate resistance for use in making tyres.

Each carcass ply is then assembled with the other tyre components, such as said bead cores for example, on a so-called cylindrical building drum. The carcass ply is turned up around said bead cores in such a manner that when the whole carcass structure, first made in the form of a cylindrical sleeve, is shaped into a toroidal conformation, the carcass ply and bead cores keep associated with each other, the carcass ply being turned up around said bead cores and extending from the inside to the outside both axially and radially.

In a subsequent operation other tyre components, such as belt structure, sidewalls and tread band, are then assembled (on a shaping drum for example) on said carcass structure.

According to recent production processes, as depicted in document EP 928 680 for example, in the name of the same Applicant, a tyre can be directly built on a toroidal support. A first carcass ply is formed by laying strip-like elements on said toroidal support, each of said strip-like elements comprising longitudinal thread-like elements incorporated in a layer of elastomer material. Said strip-like elements are sequentially laid down so as to form a carcass structure in which the strip-like elements are partly overlapped at side portions of the tyre and disposed in circumferential side by side relationship with each other at the crown region of the tyre itself. Annular reinforcing structures are associated with the carcass ply which comprise a first and a second circumferential annular inserts for example, and an elastomer filler interposed therebetween. A second carcass ply can be made in superposed position with respect to the first carcass ply and said annular structures. Then a belt structure also made by deposition of strip-like elements is associated with the carcass structure thus formed. Subsequently, a tread band and a pair of sidewalls are applied by superposition of an elementary semi-finished product of elastomer material in the form of a strap of appropriate sizes laid down into coils disposed in axial side by side and/or radial superposition relationship. Therefore, this process contemplates use of at least two different types of elementary semi-finished products and more specifically a strap, i.e. a section member made of elastomer material alone of substantially rectangular section and the strip-like element of elastomer material into which thread-like reinforcing elements are incorporated, typically textile or metallic cords. The strip-like element thus made contains a given number of cords per centimeter of its transverse dimension, and said number identifies the "density" of the cords.

It should be noticed that the tyre made in accordance with the above description has its carcass structure associated with the annular reinforcing structures but not turned up with respect to the latter. To comply with the requirements of a carcass structure more linked to the annular reinforcing structures and obviate possible structural problems arising from the carcass ply partly slipping off the annular reinforcing structures during tyre manufacture, some solutions have been proposed.

For example, document EP 0 983 876 discloses a radial tyre in which the carcass ply is formed of a continuous cord repeating in succession a path between a pair of bead portions in a direction circumferential to the tyre.

Document WO 00/26043 in the name of the same Applicant discloses a tyre and a method of making it, in which the carcass structure comprises at least one carcass ply formed of strip-like elements comprising longitudinal thread-like elements incorporated in a layer of elastomer material. The strip-like elements have respective crown portions disposed in circumferential side by side relationship with each other, as well as side portions radially extending at the tyre sidewalls. The side portions are each at least partly covered with a side portion belonging to a stretch of an adjacent portion. Associated with the carcass ply are annular structures each of which comprises a pair of inextensible inserts having the conformation of an annulus, between which a turned-up flap of the carcass ply is interposed, after possible interposition of an elastomer filling insert.

The Applicant has ascertained that a tyre built in accordance with the above mentioned documents can have some drawbacks. In particular, the Applicant could notice that the diameter in the crown region of the toroidal support on which building takes place, is bigger than the diameter at the beads and this condition is more marked in the toroidal supports designed for making tyres for heavy-duty vehicles such as trucks, articulated lorries and the like. Consequently, deposition of a plurality of elongated elements circumferentially adjacent to each other in the crown region of the carcass causes overlapping of the ends of said elements in the bead region. This circumstance brings to construction of beads having an apparently reinforced structure due to the increased density of the cords, which structure is on the contrary substantially weakened. In fact, under use conditions the mutually superposed cords do not work correctly and in a uniform manner, some of them being strongly submitted to tensile stresses, other to compressive stresses, thereby triggering separation between the elastomer material and the reinforcing cords so that, as a result, the tyre will have a shorter duration.

The Applicant has also ascertained that turning up such a structure, i.e. a carcass ply obtained by approaching and/or partially overlapping a plurality of elongated elements around an annular reinforcing structure, generates a further increase in the structural unevenness in a critical tyre region such as the bead region, which unevenness too has then repercussions on the tyre duration as it generates irregularities in stress distribution during rolling and possible fatigue failure in relatively short periods of time.

SUMMARY OF THE INVENTION

The Applicant has found that a tyre built on a toroidal support has a more regular structure which is consequently more effective in stress distribution if at least one carcass ply associated with an annular reinforcing structure is only partly turned up around a bead core belonging to said structure.

More specifically, the Applicant has found that the drawbacks found in the known art can be overcome by turning up only part of the elongated elements laid on said toroidal support, preferably those that are not mutually adjacent.

It is to be pointed out that an elongated element is intended here and in the following as "turned up" around an annular reinforcing structure or a bead core in the bead region, if at least one straight line parallel to the straight line tangent to the radially outermost point of the tyre section identified by the lying plane of said elongated element crosses the profile of said elongated element in said bead region at least at two distinct points. In the case of a radial tyre, the lying plane of said elongated element is substantially coincident with a right section of the tyre and the straight line tangent to the radially outermost point of said right section is parallel to the rotation axis of the tyre itself.

By "bead region" it is intended, as previously illustrated, the axially internal circumferential region of the tyre designed for tyre anchoring to a mounting rim, each bead region internally comprising said annular reinforcing structure.

More particularly, the Applicant has found that in a tyre built on a toroidal support, having at least one carcass ply comprising a plurality of elongated elements laid on said toroidal support in such a manner that at least part of said elongated elements has an end radially internal to the ends of the adjacent elongated elements, turning-up of said ends around an annular reinforcing structure prevents occurrence of superpositions in said ply, between the cords of adjacent elongated elements and between the elongated elements themselves at their end portions. In this way the Applicant obtains a tyre having a mechanically homogeneous structure at the bead region due to the presence of a carcass ply partly turned up around at least one bead core belonging to an annular reinforcing structure.

In a first aspect the invention relates to a tyre for vehicle wheels comprising: a carcass structure including at least one carcass ply, said carcass structure having two side portions at positions spaced apart from each other in an axial direction, and a crown portion extending in a radially external position between said side portions, at least one annular reinforcing structure associated with said carcass structure at said side portions, said annular reinforcing structure comprising at least one bead core, one tread band at a position radially external to said carcass structure, and a pair of sidewalls at axially opposite positions on said carcass structure, each carcass ply comprising a plurality of elongated elements disposed in a substantially U-shaped conformation around the cross-section profile of said tyre, wherein a fraction of the plurality of said elongated elements is turned up around said at least one bead core.

In a preferred embodiment, said annular reinforcing structure comprises a first bead core at an axially internal position and a second bead core at an axially external position relative to said carcass ply.

In a different embodiment, said fraction of the plurality of elongated elements is turned up around said axially-external second bead core.

In another embodiment, said fraction of the plurality of elongated elements is turned up around said axially-internal first bead core.

In a particular embodiment, in the tyre in accordance with the invention said elongated elements are provided to consist of strip-like elements.

In a preferred embodiment, said strip-like elements are of at least two lengths different from each other.

In a further embodiment said strip-like elements are of the same length.

In a further aspect the invention relates to a method of manufacturing a tyre for vehicle wheels, said tyre comprising a carcass structure including at least one carcass ply, at least one annular reinforcing structure comprising at least one bead ring and associated with said carcass structure, one tread band at a radially external position to said carcass structure, and a pair of sidewalls at axially opposite positions on said carcass structure, wherein accomplishment of said carcass structure comprises the steps of:

preparing a plurality of elongated elements coated with at least one layer of elastomer material;

laying each elongated element onto a toroidal support in a substantially U-shaped conformation around the cross-section profile of said toroidal support to define two side portions spaced apart from each other in an axial direction, and a crown portion extending at a radially external position between said side portions;

applying said at least one bead core at a region close to said side portions, at least one fraction of said elongated elements having an end at a radially more internal position than said at least one bead core;

turning up said ends of said fraction around said bead core.

In a preferred embodiment, said turning-up step is preceded by a step of laying at least one axially-internal first bead core and one axially-external second bead core relative to said carcass ply.

In a further embodiment said turning-up step is carried out around said axially-external second bead core.

In a different embodiment of the method in accordance with the invention, said turning up step is carried out around said axially-internal first bead core.

BRIEF DESCRIPTION OF THE DRAWINGS

Further features and advantages of the invention will become more apparent from the detailed description of some preferred but not exclusive embodiments of a tyre for vehicle wheels and the manufacturing method related thereto, in accordance with the present invention.

This description will be set out hereinafter with reference to the accompanying drawings given by way of non-limiting example, in which.

DETAILED DESCRIPTION OF THE EXEMPLARY EMBODIMENTS

Figure 1:
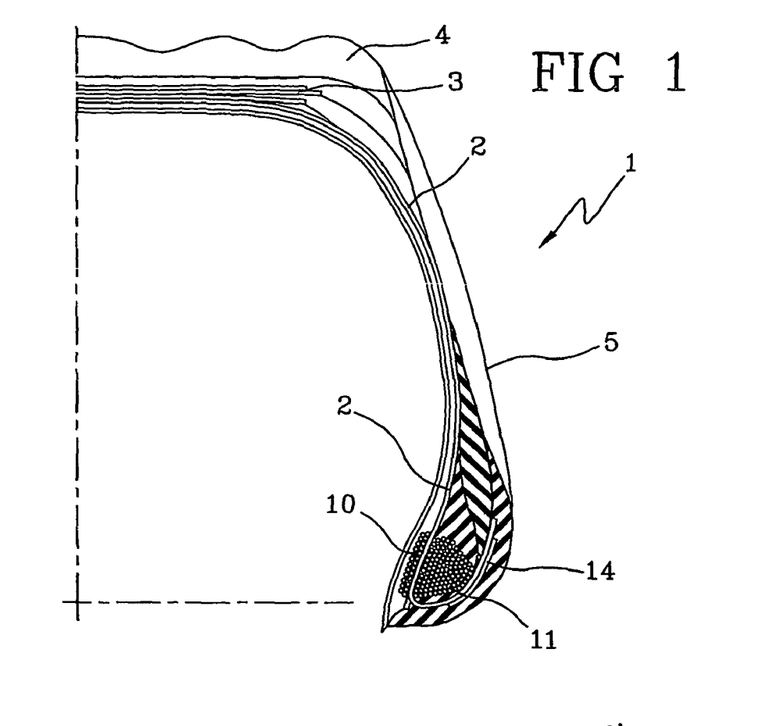
FIG. 1 is a diagrammatic view in right section of a green tyre built by the method of the invention.

With reference to FIG. 1, a tyre for vehicle wheels made by the method of the invention is identified by reference numeral 1.

Tyre 1 essentially comprises a carcass structure having at least one carcass ply 2 of a toroidal conformation, which is associated by its circumferential edges with a pair of annular reinforcing structures, each having at least one bead core and each of which, in the finished tyre, is positioned in a region usually defined as "bead" which ensures coupling of the tyre with the tyre mounting rim. At a radially external position to said carcass ply 2 a belt structure 3 is provided which comprises one or more belt strips superposed on each other. A tread band 4 is disposed thereupon at a radially external position to said belt structure: in the vulcanised tyre, this band usually has an appropriate tread pattern (not shown) moulded during the vulcanisation process; finally a pair of sidewalls 5 is laterally provided on opposite sides of said carcass structure.

The carcass structure is internally preferably coated with a layer of elastomer material defined as "liner" to ensure airtightness of the tyre under use conditions.

Assembling of the above listed parts is carried out as substantially illustrated in the already mentioned document EP 0 928 680 in the name of the same Applicant. In short, a limited number of semi-finished products such as straps of elastomer material, elongated elements i.e. strip-like elements of elastomer material reinforced with textile or metallic cords, and wires, generally steel wires, also coated with elastomer material, are fed onto a toroidal support having the same configuration as the inner walls of the tyre that is wished to be obtained. Said support is set in motion, preferably by a robotized system, through a plurality of stations in each of which a particular one of the tyre building steps is carried out by means of automated sequences. Thus the whole tyre 1 structure described above is formed by superposition on said toroidal support, thereby obtaining a green tyre ready for vulcanisation.

More specifically, in accordance with the invention, on a toroidal support the outer profile of which matches that of the radially inner surface of the green tyre, at the beginning of the building process the so-called "liner" is preferably laid, said liner substantially consisting of a rubber sheet that in the vulcanised tyre constitutes the inner surface of the tyre itself, which is air-proof.

Before making the carcass ply, one or more elastomer fillers (not shown) are optionally laid on said toroidal support, which fillers preferably have a shape radially tapering outwardly in a right-section view of the tyre.

Manufacture of said tyre 1 goes on by laying, on said toroidal support, a first pair of bead cores 10 each belonging to a different one of said annular reinforcing structures, at a position radially internal and/or axially external to said elastomer filler.

More particularly, each bead core 10 comprises a pack of coils made of thread (preferably wire) disposed in radial superposition and axial side by side relationship with each other.

To build the coil pack, a plurality of coils is wound on said building support, said coils being radially superposed upon themselves and in axial side by side relationship and consisting of a metal wire or, alternatively, of a cord of metal wires, a ribbon of said wires or cords, or also a metal strap.

Alternatively, each coil pack can be made separately and subsequently applied on said toroidal support.

The material used for said bead cores can be any textile or metallic material or a material of other nature provided with appropriate features of mechanical strength; preferably this material is a steel wire commonly utilised in the tyre technology, or a metallic cord provided with a corresponding strength and load ability.

Subsequently to laying of said bead cores 10, laying of one or more carcass plies 2 begins, so as to make the carcass structure of the tyre of the invention.

The following description refers, without any limiting purpose, to building of a tyre for heavy-duty vehicles such as trucks, articulated lorries, buses and the like, and therefore manufacture and use of strip-like elements of elastomer material reinforced with metallic cords is advantageously provided for said carcass ply. In the case of tyres of other type (for cars, for example) the reinforcing cords of said strip-like element are preferably textile cords of natural or synthetic fibre (cotton, polyamide, polyester), typically nylon or rayon.

Said elongated element or strip-like element is prepared by use of preferably 2 to 6 metallic cords conducted through an extrusion head coating them with a suitable elastomer material, thereby creating a continuous ribbon-like element in which said cords are parallel to each other in the longitudinal direction of the element itself.

The diameter of the metal wire used for making said cords can be included between 0.12 and 0.4 mm, preferably between 0.14 and 0.23 mm, whereas said cords are preferably made with a wrapped structure, in the following configurations, for example: 3+9×0.22 W and 3+9+15×0.175 W. Use of a cord having a 7×4×0.175 W configuration, i.e. comprising 7 strands, each consisting of 4 elementary steel filaments with a 0.175 mm diameter, wound by a wrapped wire consisting of a steel wire with a 0.15 mm diameter, spiralled around the cord, has been judged as particularly suitable.

The continuous ribbon-like element thus made is not directly employed but duly cut to size to form said strip-like elements, for application on said toroidal support to make said carcass ply 2.

In accordance with the disclosure of the patent application PCT/IT01/00656 in the name of the same Applicant, preferably each strip-like element previously to said application is submitted to a necking-down step at intervals, along its longitudinal extension, which locally modifies the cross-sectional profile thereof and the cord density.

Figure 4B:
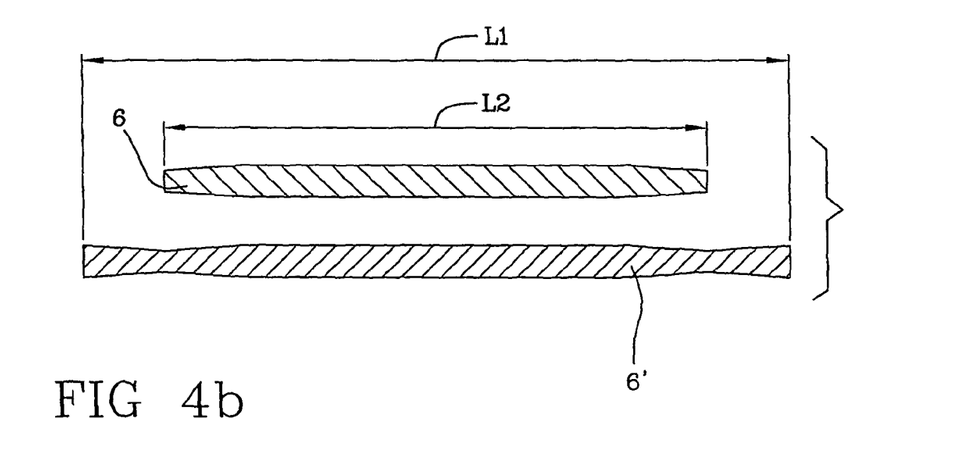
FIG. 4b is a plan view of two different strip-like elements forming the ply in FIG. 4a submitted to a necking-down step.
Figure 5A:
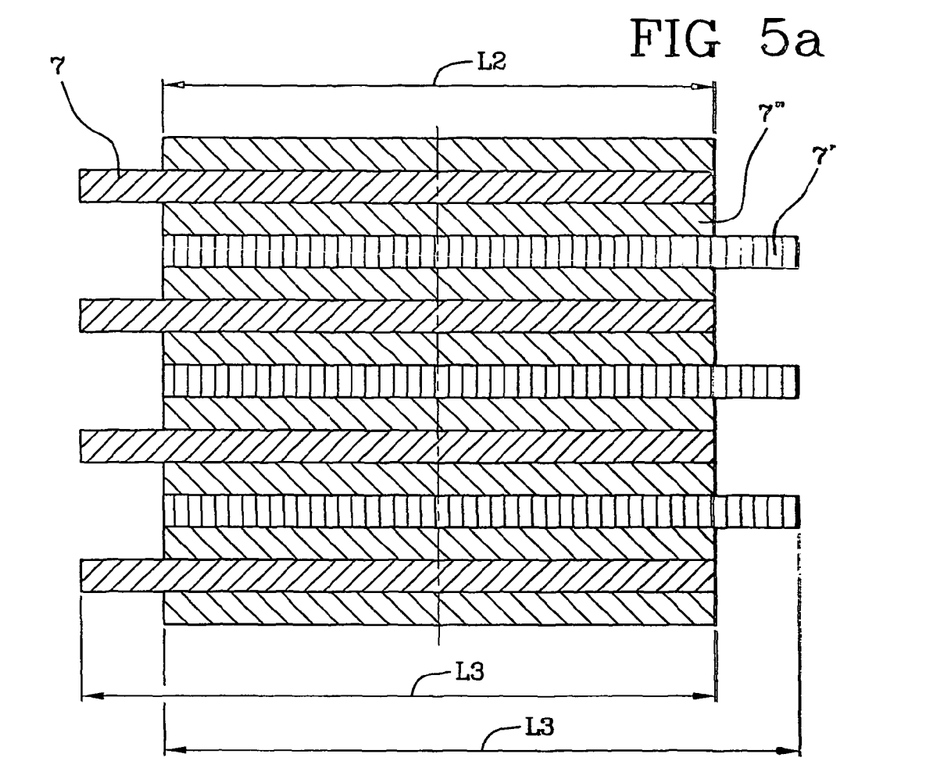
FIG. 5a is a development in a horizontal plane of a different embodiment of a carcass ply of the tyre in accordance with the invention.
Figure 5B:
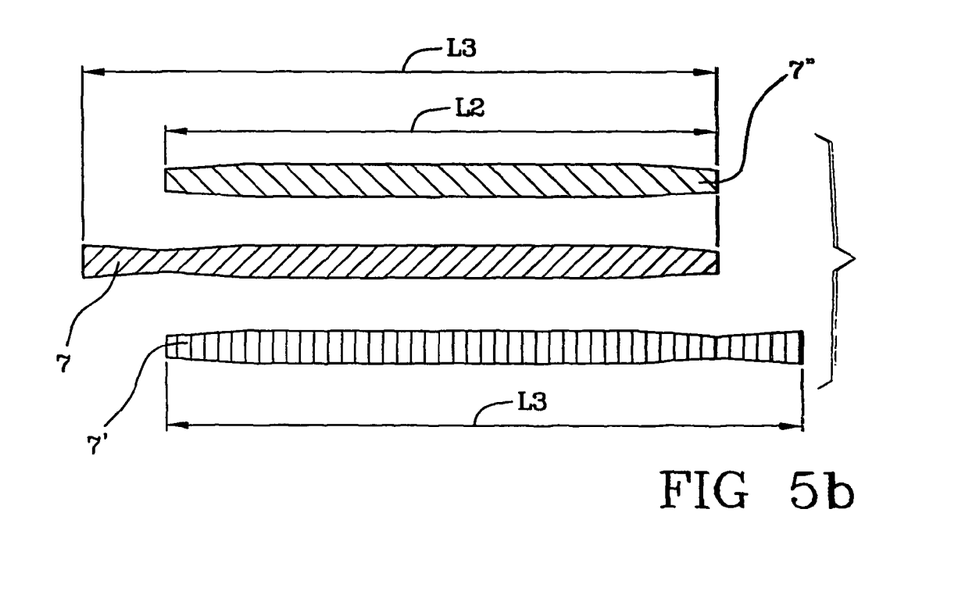
FIG. 5b is a plan view of two different strip-like elements (one of them in two distinct positions) forming the ply in FIG. 5a submitted to a necking-down step.

More specifically, driving members not shown drag forward the end portion of said continuous ribbon-like element that has been submitted to necking-down and bring a subsequent portion to a necking-down position. After this portion too has been submitted to a necking-down step, cutting members, not shown too, cut said ribbon-like element generating said strip-like element of the required size for use in the carcass structure of the tyre (FIGS. 4b, 5b). Said strip-like element is then picked up by gripping members (not shown) for making, as better illustrated in the following, said carcass ply 2, whereas the driving members bring another portion of the continuous ribbon-like element to a position adapted to submit it to a necking-down step.

In accordance with the invention, during manufacture of said carcass ply 2, gripping members of the same type, for example, as described in the European Patent Application issued under No. 0 928 680, dispose each strip-like element on said toroidal support in a substantially U-shaped conformation around the cross-section profile of said support to define two side portions substantially extending in planes orthogonal to the geometric rotation axis of the support itself, at axially spaced apart positions, and a crown portion extending in a radially external position between said side portions.

Figure 1B:
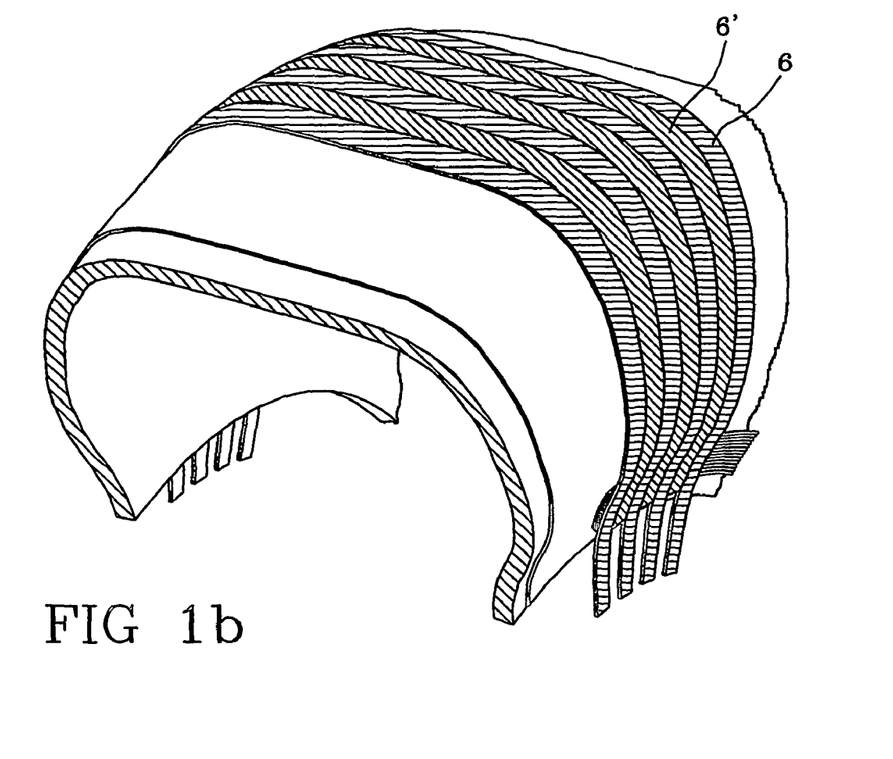
FIG. 1b is a partial perspective view of the tyre in reference during building of same.
Figure 2:
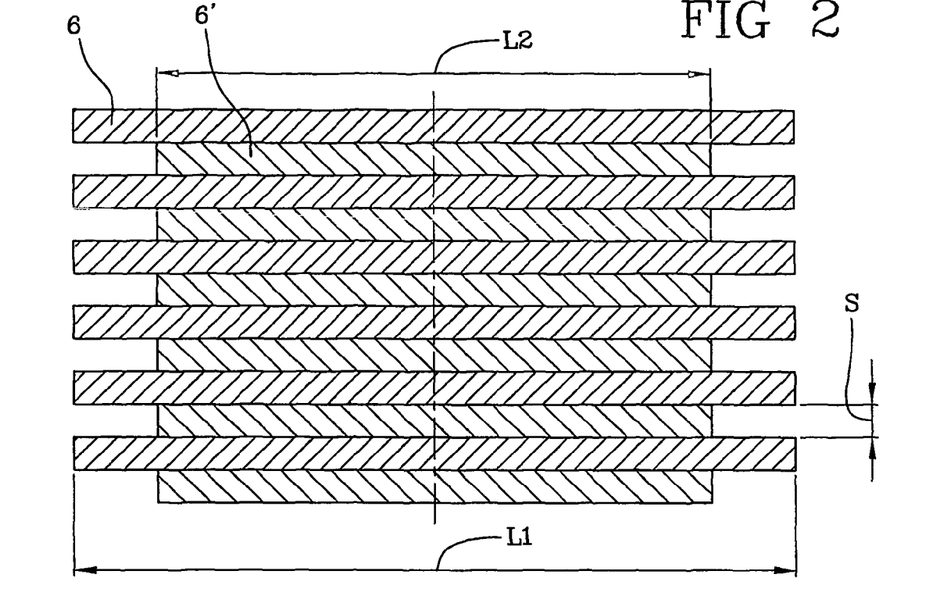
FIG. 2 is a development in a horizontal plane of an embodiment of a carcass ply of the tyre in accordance with the invention.

More specifically, in the embodiment shown in FIGS. 1b and 2 for example, the strip-like elements 6, 6' previously cut to two different lengths, $L_1$ and $L_2$ respectively, with $L_1 > L_2$, are disposed in a mutually-alternated side by side relationship at the end of the manufacture of the carcass ply 2, all strip-like elements being laid down symmetrically with respect to the equatorial plane of the toroidal support, i.e. the transverse centre lines of each strip-like element 6, 6' are aligned with each other and they all substantially lie in said equatorial plane X-X.

Figure 3:
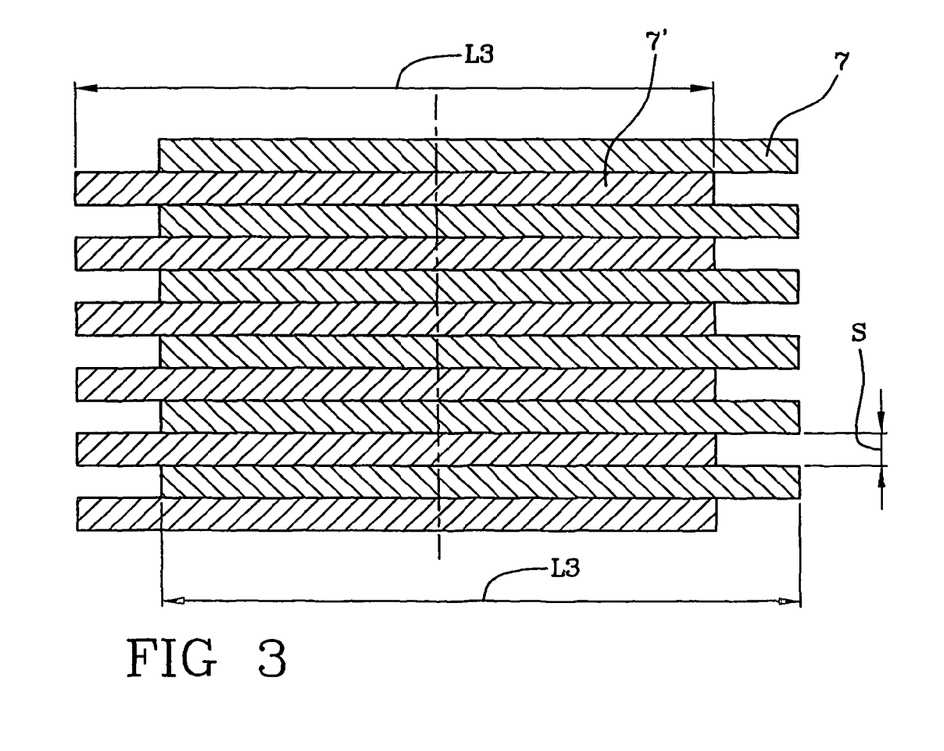
FIG. 3 is a development in a horizontal plane of a further embodiment of a carcass ply of the tyre in accordance with the invention.

Alternatively, as shown in FIG. 3, the strip-like elements 7, 7' are cut to a single length $L_3$, each strip-like element being disposed asymmetrically with respect to said equatorial plane X-X, at the end of the manufacture of the carcass ply. More exactly, the transverse centre lines of each strip-like element 7, aligned with each other, are not aligned, when deposition has been completed, with the transverse centre lines (which are aligned with each other too) of the strip-like elements 7', the lying planes of the transverse centre lines of the strip-like elements 7 and 7' being thus distinct from each other and offset on opposite sides with respect to the equatorial plane X-X.

As can be noticed, by these depositions the resulting carcass ply 2 just built on the toroidal support has a plurality of terminal parts or ends of the component strip-like elements at a radially more internal position on each side of the toroidal support than the immediately adjacent strip-like elements, said ends being separated by a gap "s".

Obviously, any combination of the above illustrated arrangements is in principle possible.

Figure 4A:
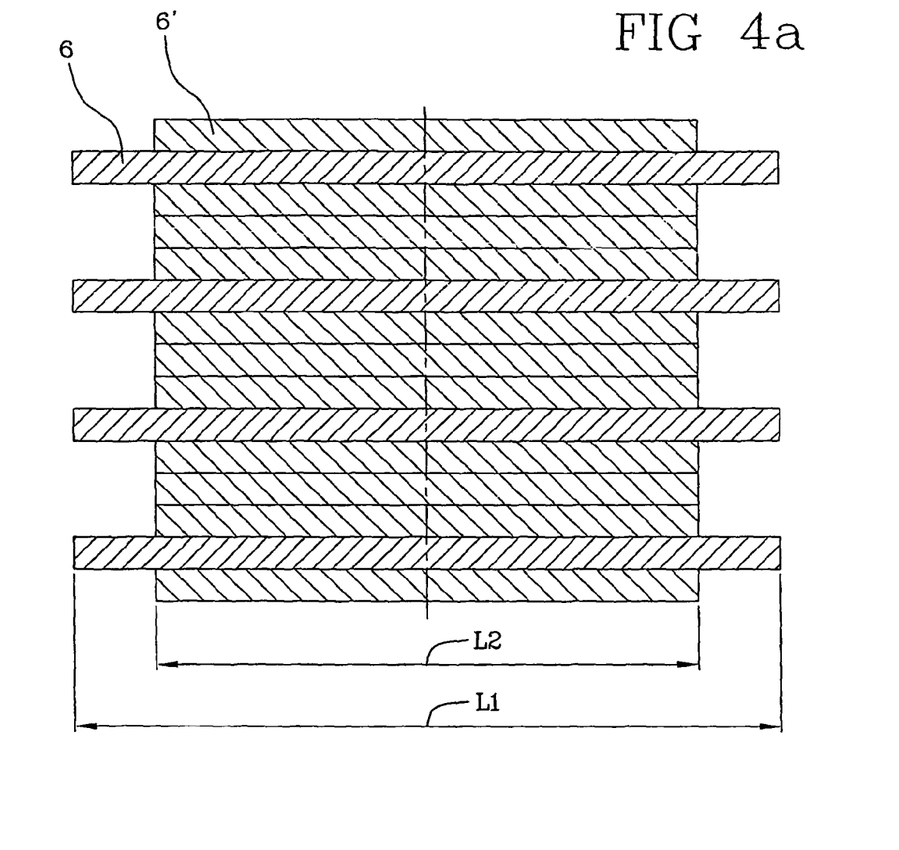
FIG. 4a is an extension in a horizontal plane of another embodiment of a carcass ply of the tyre of the invention.

For example, as shown in FIG. 4a, by making use of the above mentioned strip-like elements 6 and 6' of length $L_1$ and $L_2$, said strip-like elements can be such laid that on ply 2 a strip-like element of greater length $L_1$ is obtained which is alternated with at least two strip-like elements of smaller length $L_2$, three strip-like elements in the case shown in said figure.

In another embodiment, the strip-like elements 7 and 7' of the same length $L_3$ and asymmetrically laid as above illustrated, are alternated with at least one strip-like element 7" of smaller length $L_4$ symmetrically laid with respect to the equatorial plane X-X, as shown for the strip-like elements 6 and 6'.

In this way the distance or gap "s" between two ends of two strip-like elements in succession having a greater radially internal extension than the ends of the strip-like elements interposed therebetween can be adjusted at will.

More particularly, the Applicant considers as the preferred ones those embodiments in which said carcass plies (made as in FIGS. 2 and 3) have said distance "s" substantially coincident with the transverse size of the strip-like element end.

Preferably, the cords of each strip-like element are disposed radially, i.e. at 90° with respect to the circumferential direction of the toroidal support.

The strip-like elements 6, 6', 7, 7', 7" adhere to the underlying layers over the whole longitudinal extension thereof, going from bead to bead along the outer surface of the toroidal support, because the latter is preferably coated with an adhesive material, said liner for example.

As shown in FIGS. 2, 3, 4a, 5a, said strip-like elements are disposed in side by side relationship along the circumferential extension of said toroidal support. As a result of necking-down exerted on the end regions of the strip-like element balancing the circumferential extension at the crown with the circumferential extension at the beads, said side by side arrangement is advantageously maintained along the whole linear extension, from bead to bead.

Said arrangement can be achieved either by a single rotation of the toroidal support, by virtue of a continuous approaching of each strip-like element with respect to the preceding one, in which case, when required, a cutting step is to be carried out for making strip-like elements of different length ($L_1$, $L_2$, $L_3$ or $L_4$), or preferably by two or more rotations of the same support. In the last mentioned case laying of each strip-like element 6, 6', 7, 7', 7" is followed by a rotation of the support corresponding to a multiple of the circumferential space occupied by each strip-like element, to enable laying of another series of strip-like elements during the subsequent turn, going on until the whole toroidal surface is completely covered: at this point the carcass ply 2 has been completed. In this case by an appropriate control of the laying step and the step of rotating the toroidal support it is possible to advantageously treat only groups of strip-like elements of the same length alternated with each other during laying.

Subsequently to the carcass ply 2, said annular reinforcing structures are completed by deposition of a further pair of bead cores 11 at a position axially external to said bead cores 10. For example, in the exemplary embodiments shown in FIGS. 1 and 6-12, the bead cores 10 and 11 are disposed at the same radial position. Accomplishment of the bead cores 11 takes place following the same modalities as previously illustrated for deposition of the bead cores 10 and substantially using the same materials.

Preferably, the axial extension of the bead cores 11 is greater than the axial extension of the bead cores 10.

Once said bead cores 11 have been made, tyre 1 under building will have one carcass ply 2 sandwiched between the bead cores 10 and 11, with a plurality of said strip-like elements having at least one of their ends at a position radially internal to said bead cores 10, 11, i.e. projecting in a radially internal direction with respect to said bead cores.

Other strip-like elements will have both ends substantially enclosed by said bead cores, i.e. substantially not projecting therefrom in a radially internal direction; for example they can project in a direction radially internal to said bead cores 10, 11 over a length generally not exceeding 2% of the transverse length from bead to bead of the carcass ply.

Said ends projecting in a radially internal direction from said bead cores 10, 11 are then turned up preferably around the axially external bead cores 11.

Figure 6:
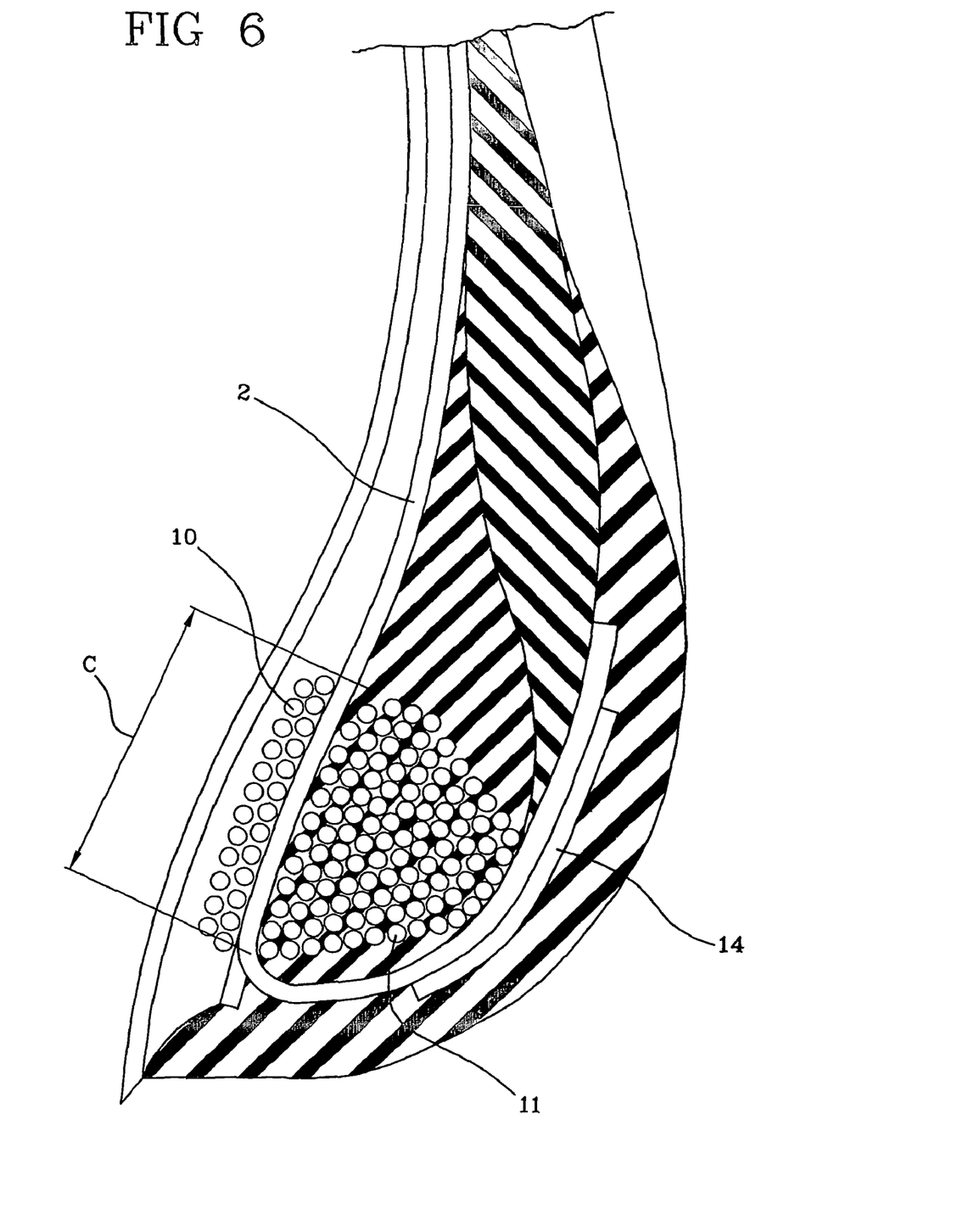
FIG. 6 is a view in right section of the bead region of the tyre obtained by the method in reference.
Figure 9:
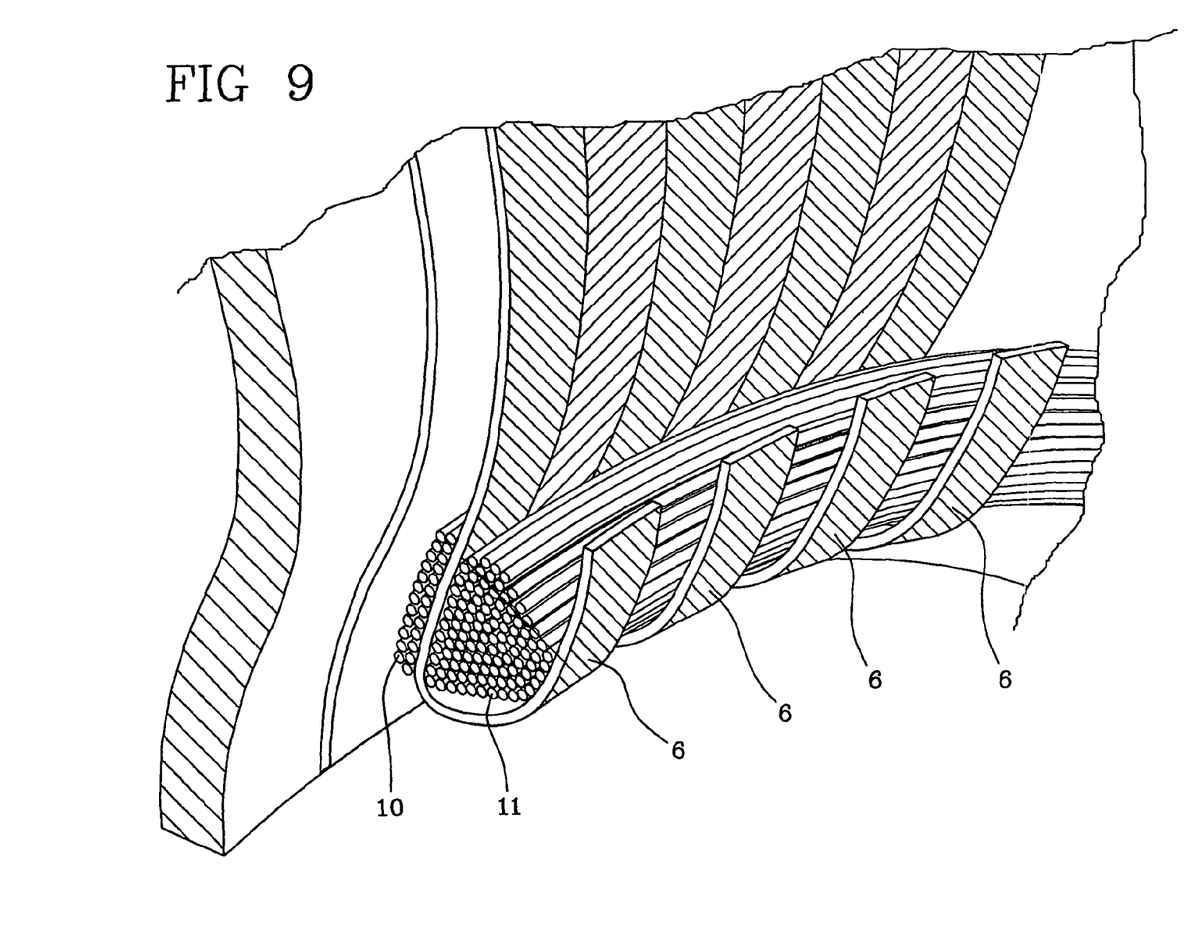
FIG. 9 is a partial perspective view of the bead of the tyre in reference during manufacture of same.

To carry out this step, an appropriate inflatable bladder (called "bladder turn up") can be employed, as well as other mechanical devices capable of lifting said ends bringing them into contact with the axially and radially external edges of the axially external bead cores 11 (FIGS. 6, 9).

It will be recognised that the percentage of the strip-like elements that will have one of their ends turned up around the same annular reinforcing structure and in particular the same bead core can vary, depending on the deposition carried out for building said carcass ply 2. For example, in accordance with that which is shown in FIGS. 2 and 3, said percentage is substantially 50%, and it is 25% in FIGS. 4*a* and 5*a*. In any case the Applicant thinks it preferable to make the carcass ply in such a manner as to allow a percentage of strip like element ends turned up around each bead core that substantially does not exceed 50%, to advantageously avoid any possibility of overlapping of two adjacent strip-like elements that are to be turned up.

Figure 12:
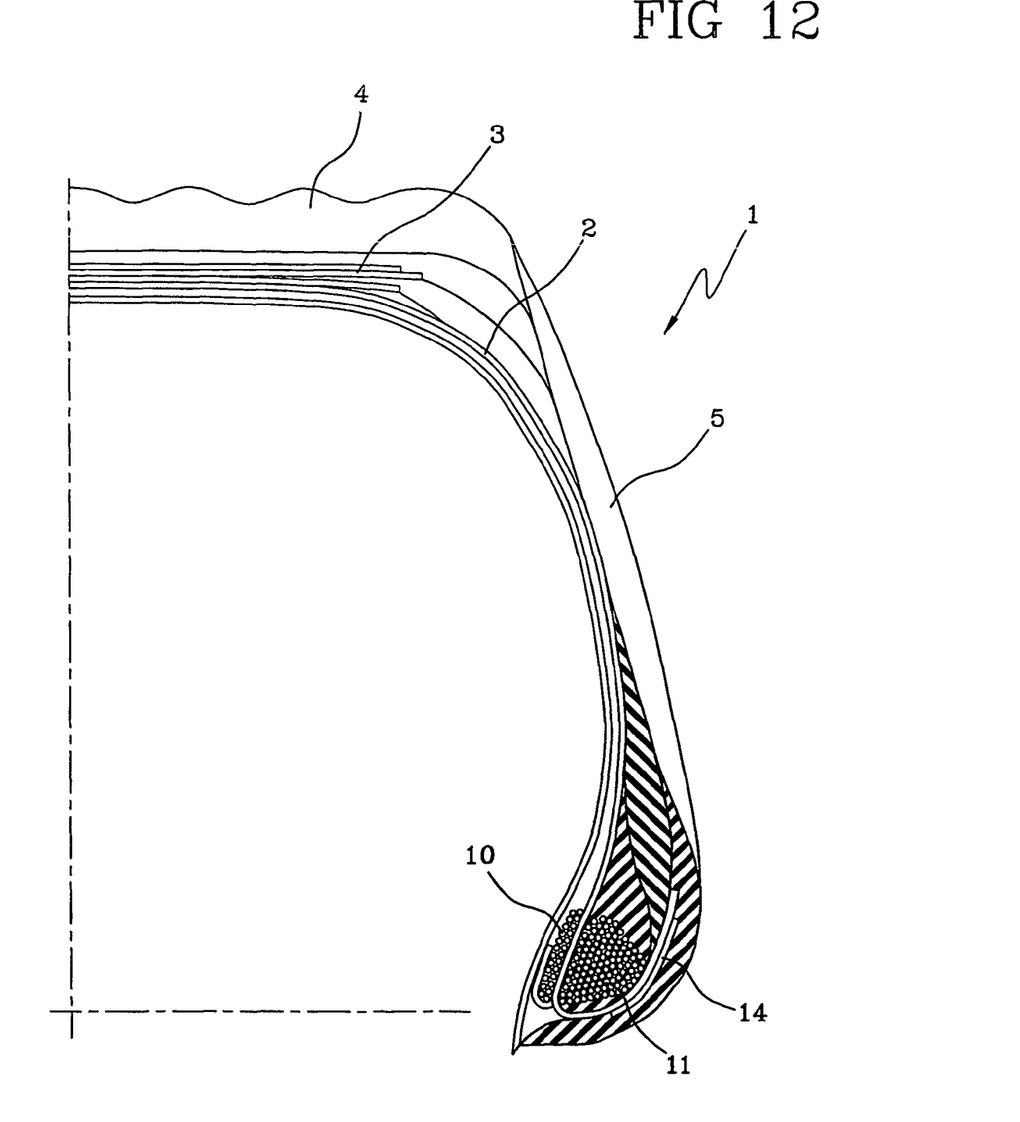
FIG. 12 is a view in right section of the bead region of a different embodiment of the tyre of the invention.

In an alternative embodiment shown in FIG. 12, said ends projecting in a radially internal direction from said bead cores 10, 11 are turned up partly around the axially external bead cores 11 and partly around the axially internal bead cores 10. It will be recognised that in this way, all of the elongated elements or strip-like elements forming the carcass ply can be altogether turned up around an annular reinforcing structure, for example by turning up 50% of them around the axially internal bead core and 50% around the axially external bead core. In this case, since substantially all the strip-like elements will have their ends projecting in a radially internal direction with respect to the bead cores 10, 11, it is required that necking down to which such elements are submitted as well as the sizes of said elements and/or the geometries at stake of the toroidal support should be of such a nature as to substantially avoid overlapping phenomena of the different elements at the bead region.

Preferably the interface stretch "c" between said carcass ply 2 and said bead cores 10, 11, measured along the cross sectional profile of said ply 2 is included between 15 and 70 mm (FIG. 6).

In a preferred embodiment of tyre 1, the step of turning up the ends is preceded by laying of a layer of reinforced polymeric material (with or without short fibres of the aramidic type, Kevlar® for example) which is located at a position axially external to the bead core 11 substantially in contact with the axially external edge of the latter, being consequently in a position axially internal to said turned-up end of the strip-like elements of said ply 2.

In a different embodiment of tyre 1 in accordance with the invention (FIG. 7), the annular reinforcing structures of said tyre are completed with a third pair of bead cores 13 at a position axially external to said bead cores 11 so as to enclose the end portions of the turned-up strip-like elements between the bead cores 11 and 13.

Figure 7:
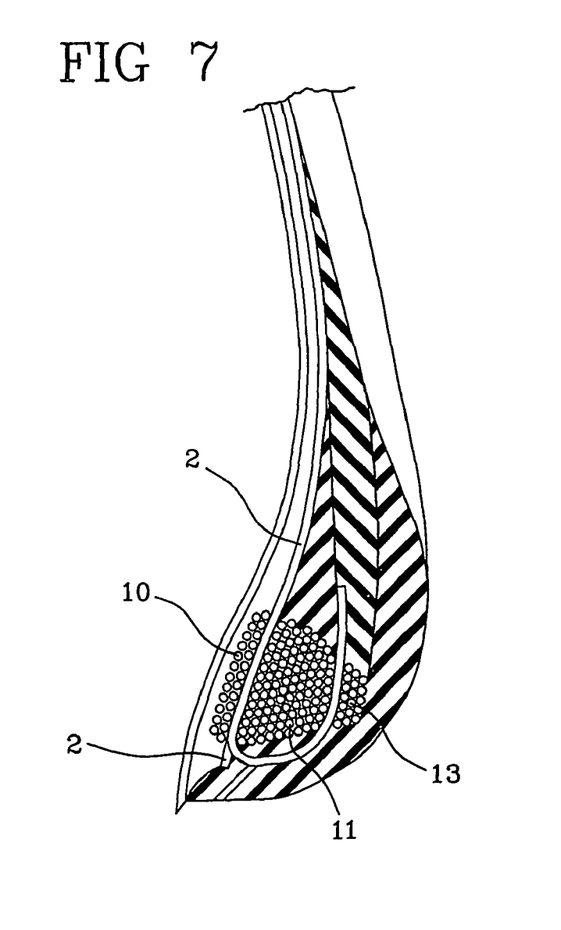
FIG. 7 is a view in right section of the bead region of a different embodiment of the tyre obtained by the method in reference.

Said bead cores 13 consist of a stiffening element of the bead region acting against bending stresses, but they can also perform the structural function of protective edge, to protect the carcass ply 2 from the rim flange.

Figure 8:
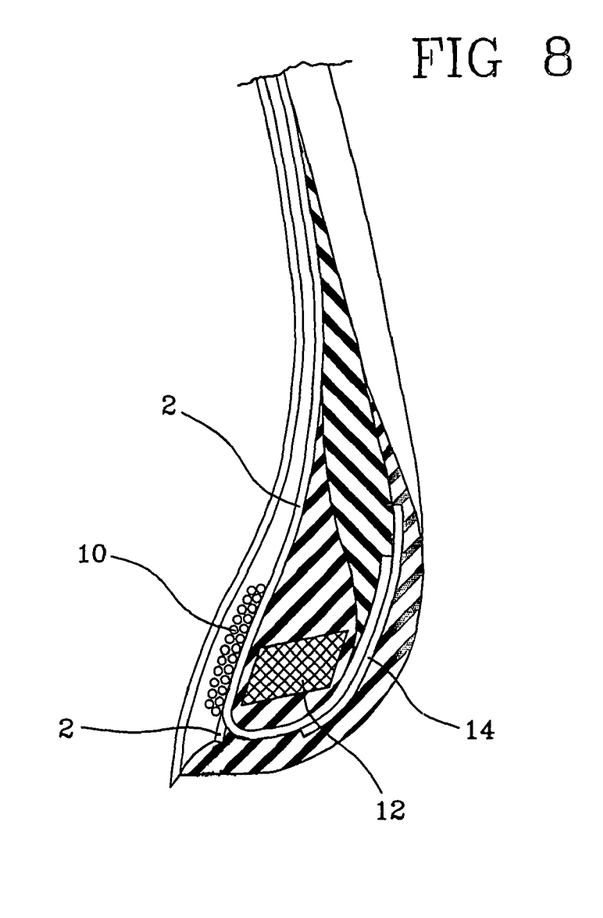
FIG. 8 is a view in right section of the bead region of a further embodiment of the tyre obtained by the method in reference.

In a further alternative embodiment of the tyre in reference, as shown in FIG. 8, said bead cores 11 can be replaced by bead cores 12 called "of standard production", i.e. made separately as a semi-finished product and subsequently applied to said tyre 1 after making the carcass ply 2. In this case, to improve the interface between the bead cores 10, 12 and the carcass ply interposed therebetween, laying of some coils of spiraled bead core (i.e. coils similar to those of the bead core 10) may be suitable at an axially external position to said ply 2 and axially internal to said bead core 12 of standard production.

Figure 10:
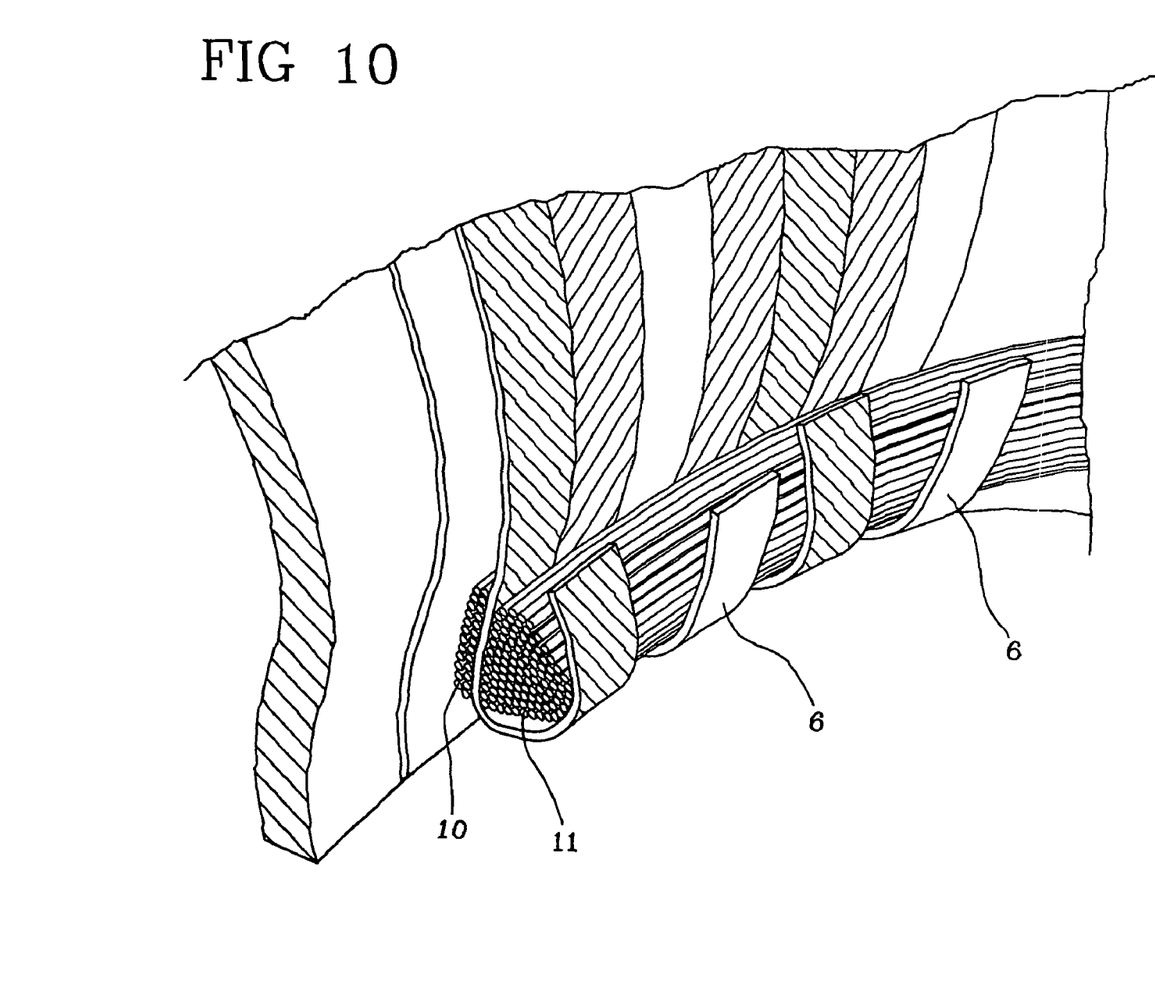
FIG. 10 is a partial perspective view of the bead of the tyre in reference in which an alternative embodiment of the method of the invention has been adopted.
Figure 11:
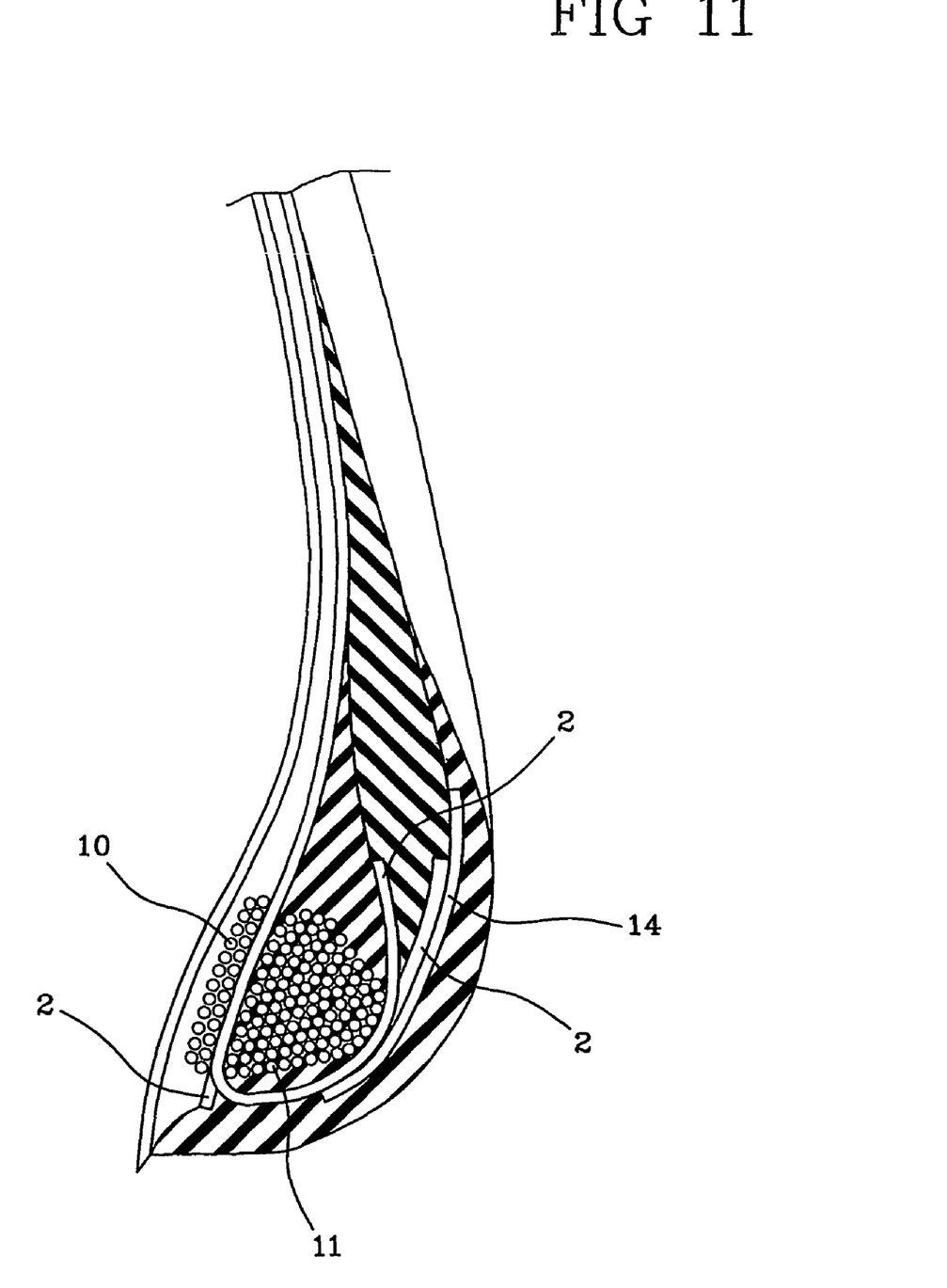
FIG. 11 is a view in right section of the bead region shown in FIG. 10.

In another alternative embodiment of the tyre in reference, the turned-up portion of said strip like element ends can take place at different moments thereby obtaining strip like element ends turned up in different planes (FIGS. 10, 11). In this case it is preferable for said turning-up step to be carried out in two sub-steps separated by a step of laying a filler in an axially external position to the axially external edge of said second bead core 11 or 13, the strip like element ends turned-up during the second sub-step lying consequently in different planes relative to the strip like element ends turned up during the first sub-step.

The resulting carcass ply therefore will have a plurality of elongated elements turned up in different planes around said annular reinforcing structures.

As shown for example in FIGS. 1, 6, 8, 11, the tyre in accordance with the invention may ultimately involve a reinforcing edge 14 at an axially and/or radially external position to said annular reinforcing structures. More specifically, said reinforcing edge may comprise elongated reinforcing elements disposed inclined to the radial direction and preferably made up of a metallic cord having elementary filaments with a diameter included between 0.15 and 0.30 mm. Alternatively, use of textile cords is possible, said cords being made of Kevlar for example, other natural or synthetic fibres or glass fibre. Said edge 14 can have either two series of elongated elements, the elements of each series being axially superposed on, and crossed with those of the adjacent series, or a plurality of said elongated elements disposed in coplanar relationship and substantially parallel to each other.

Said elements can be directly disposed on the carcass structure or previously buried in a strip of elastomer material subsequently assembled with said carcass.

The tyre structure is finally completed with deposition of the belt structure 3, the sidewalls 5 and a tread band 4, then moulded and vulcanised.

It is to be noted that alternatively to the strip-like elements, a single continuous cord could be also used, which cord by appropriate laying in subsequent side by side arrangements on said toroidal support will make said carcass ply 2 with the same geometry. In this case therefore there will be no longer the presence, in the strict sense of the word, of a plurality of strip-like elements having terminal parts or ends, but a single cord having a plurality of stretches from bead to bead joined to each other, each junction being however substantially equivalent to each of said ends as above illustrated.

Therefore, in the present description and in the following claims, by the terminology "plurality of elongated elements" it is intended both a true multiplicity of strip-like elements physically distinct from each other, and a plurality of stretches belonging to the same cord, which substantially extend from bead to bead and are joined together.

The invention claimed is:

1. A tyre for a vehicle wheel, comprising:
   a carcass structure;
   at least one annular reinforcing structure;
   a tread band; and
   a pair of sidewalls;
   wherein the carcass structure comprises:
   at least one carcass ply;
   wherein one of the at least one carcass plies comprises:
      a plurality of elongated elements comprising a plurality of strip-like elements having terminal parts, the plurality of strip-like elements being physically distinct from one another;
      wherein the elongated elements are disposed in a substantially U-shaped conformation around a cross-section profile of the tyre,
      wherein each elongated element comprises:
         two side portions at mutually-spaced-apart positions in an axial direction; and
         a crown portion that extends at a radially external position between the side portions;
   wherein the at least one annular reinforcing structure is associated with the carcass structure at the side portions of the elongated elements,
   wherein the at least one annular reinforcing structure comprises:
      a first bead core; and
      a second bead core,
      wherein the first bead core is disposed axially internal to the at least one carcass ply,
      wherein the second bead core is disposed axially external to the at least one carcass ply, and
      wherein the first bead core and the second bead core are disposed at a same radial position of the tyre;
   wherein a fraction of the elongated elements of the carcass ply is turned up around one of the first bead core and the second bead core, the fraction being less than all of the elongated elements,
   wherein the tread band is disposed radially external to the carcass structure, and
   wherein the sidewalls are disposed at axially opposite positions on the carcass structure.

2. The tyre of claim 1, wherein the fraction of the elongated elements is turned up around the first bead core.

3. The tyre of claim 1, wherein the fraction of the elongated elements is turned up around the second bead core.

4. The tyre of claim 1, wherein the fraction of the elongated elements is turned up around the second bead core, and a remainder of the elongated elements is turned up around the first bead core.

5. The tyre of claim 1, wherein a carcass ply stretch interposed between the first and second bead cores has a cross-section profile with a length greater than or equal to 15 mm and less than or equal to 70 mm.

6. The tyre of claim 1, wherein the at least one annular reinforcing structure further comprises:
   a third bead core disposed axially external to the second bead core.

7. The tyre of claim 1, wherein the fraction of the elongated elements is less than or equal to about 50% of an overall number of the elongated elements.

8. The tyre of claim 1, wherein ends of the turned-up elongated elements lie in different planes.

9. The tyre of claim 1, wherein the tyre further comprises:
   at least one reinforcing edge;
   wherein the at least one reinforcing edge is axially external, radially external, or axially and radially external to a respective annular reinforcing structure.

10. The tyre of claim 1, wherein the strip elements comprise at least two lengths different from each other.

11. The tyre of claim 1, wherein the strip elements comprise a same length.

12. A method of manufacturing a tyre for a vehicle wheel, comprising:
   preparing a plurality of elongated elements comprising a plurality of strip-like elements having terminal parts, the plurality of strip-like elements being physically distinct from one another, wherein during preparing the plurality of elongated elements, the strip elements are submitted to necking-down, such that a cross-sectional area of the strip elements is locally reduced;
   disposing each elongated element on a toroidal support to form a carcass ply of a carcass structure;
   applying a first bead core and a second bead core at a region close to side portions of the elongated elements; and
   turning up ends of a fraction of the elongated elements around one of the first bead core and the second bead core,
   wherein the first bead core is disposed axially internal to the carcass ply,
   wherein the second bead core is disposed axially external to the carcass ply, and
   wherein the first bead core and the second bead core are disposed at a same radial position of the tyre;
   wherein the tyre comprises:
   the carcass structure;
   at least one annular reinforcing structure;
   a tread band; and
   a pair of sidewalls;
   wherein the carcass structure comprises:
   the carcass ply;
   wherein the elongated elements are coated with at least one layer of elastomer material,
   wherein the elongated elements are disposed in a substantially U-shaped conformation around a cross-section profile of the toroidal support,
   wherein each elongated element comprises:
      two side portions at mutually-spaced-apart positions in an axial direction; and
      a crown portion that extends at a radially external position between the side portions;

wherein the at least one annular reinforcing structure comprises:
the first bead core and the second bead core;
wherein the turned up ends of the fraction of the elongated elements, prior to being turned up, comprise ends at a radially more internal position than the first bead core and the second bead core, the fraction being less than all of the elongated elements,
wherein the tread band is disposed radially external to the carcass structure, and
wherein the sidewalls are disposed at axially opposite positions on the carcass structure.

13. The method of claim 12, wherein turning up the ends of the fraction of the elongated elements is carried out subsequent to disposing a layer of reinforced polymeric material axially external to the second bead core.

14. The method of claim 12, wherein the ends of the fraction of the elongated elements are turned up around the first bead core.

15. The method of claim 12, wherein the ends of the fraction of the elongated elements are turned up around the second bead core.

16. The method of claim 12, wherein the ends of the fraction of the elongated elements are turned up around the second bead core, and a remainder of the elongated elements is turned up around the first bead core.

17. The method of claim 12, wherein turning up the ends of the fraction of the elongated elements is carried out in at least two steps,
wherein two of the steps are separated by disposing a filler in an axially external position to an axially external edge of the second bead core, and
wherein the ends of the elongated elements turned-up during a second step lie in offset planes relative to the ends of the elongated elements turned up during a first step.

18. The method of claim 12, wherein turning up the ends of the fraction of the elongated elements is followed by disposing a third bead core at an axially external position to the second bead core.

19. The method of claim 12, wherein during preparing the plurality of elongated elements, a continuous ribbon element is cut into strip elements, and
wherein the elongated elements comprise the strip elements.

20. The method of claim 19, wherein the strip elements comprise at least two lengths different from each other.

21. The method of claim 19, wherein the strip elements comprise a same length.

22. The method of claim 19, wherein disposing each elongated element on the toroidal support is carried out by laying strip elements of different length symmetrically with each other relative to an equatorial plane of the toroidal support.

23. The method of claim 19, wherein disposing each elongated element on the toroidal support is carried out by laying strip elements of a same length asymmetrically relative to an equatorial plane of the toroidal support.

24. The method of claim 23, wherein disposing each elongated element on the toroidal support is carried out by further laying at least one strip element of shorter length symmetrically relative to the equatorial plane of the toroidal support.

25. The method of claim 12, wherein at least one of the first bead core and the second bead core is obtained by winding a plurality of coils of metal wire disposed in radial superposition and axial side-by-side relationship with each other.

26. The method of claim 12, further comprising:
disposing at least one reinforcing edge axially external, radially external, or axially and radially external to a respective annular reinforcing structure.

* * * * *